United States Patent [19]
Baldwin

[11] Patent Number: 6,119,822
[45] Date of Patent: Sep. 19, 2000

[54] DRUM BRAKE WITH RACK AND PINION DRIVE

[75] Inventor: Steven R. Baldwin, Troy, Mich.

[73] Assignee: Meritor Heavy Vehicle Systems, LLC

[21] Appl. No.: 09/201,627

[22] Filed: Nov. 30, 1998

[51] Int. Cl.[7] .................................................. F16D 51/00
[52] U.S. Cl. ........................................ 188/79.51; 188/325
[58] Field of Search ............................. 188/79.51–79.62, 188/325, 326, 328, 331

[56] References Cited

U.S. PATENT DOCUMENTS

| | | | |
|---|---|---|---|
| 1,805,190 | 5/1931 | Semmes ................................... | 188/328 |
| 1,875,571 | 9/1932 | Delahaye ................................. | 188/328 |
| 4,850,459 | 7/1989 | Johannesen et al. .................... | 188/156 |
| 5,913,390 | 6/1999 | Hostetler ................................. | 188/79.51 |

*Primary Examiner*—Chris Schwartz
*Attorney, Agent, or Firm*—Carlson, Gaskey & Olds

[57] ABSTRACT

A drum brake assembly as provided with a rack and pinion actuator. The rack and pinion actuator includes a pinion gear driving a pair of racks, with the racks driving the brake shoes into engagement with the brake drum. The pinion gear is provided with an adjustment thread which transmits rotation to an adjustment member. The adjustment member monitors the amount of rotation of the pinion gear during actuation, and a mechanism drives the adjustment member and the pinion gear back to its non-actuated position after completion of the braking cycle. The mechanism limits the amount of return movement of the pinion gear as necessary to provide adjustment of the brake stroke.

17 Claims, 2 Drawing Sheets

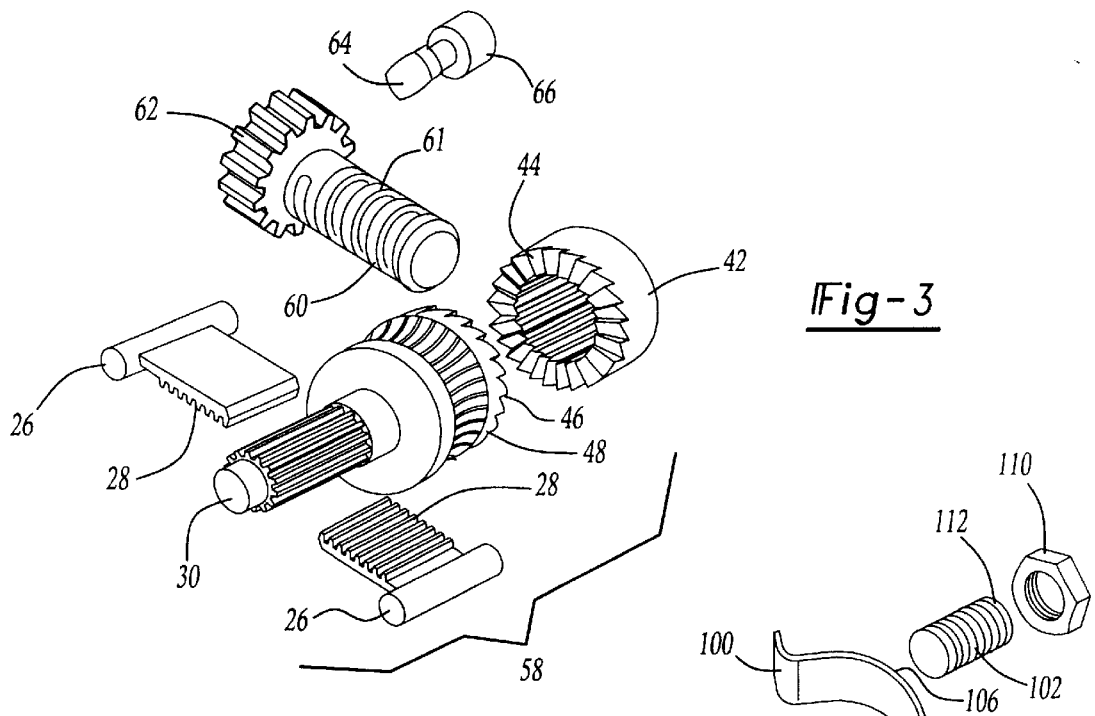
Fig-3
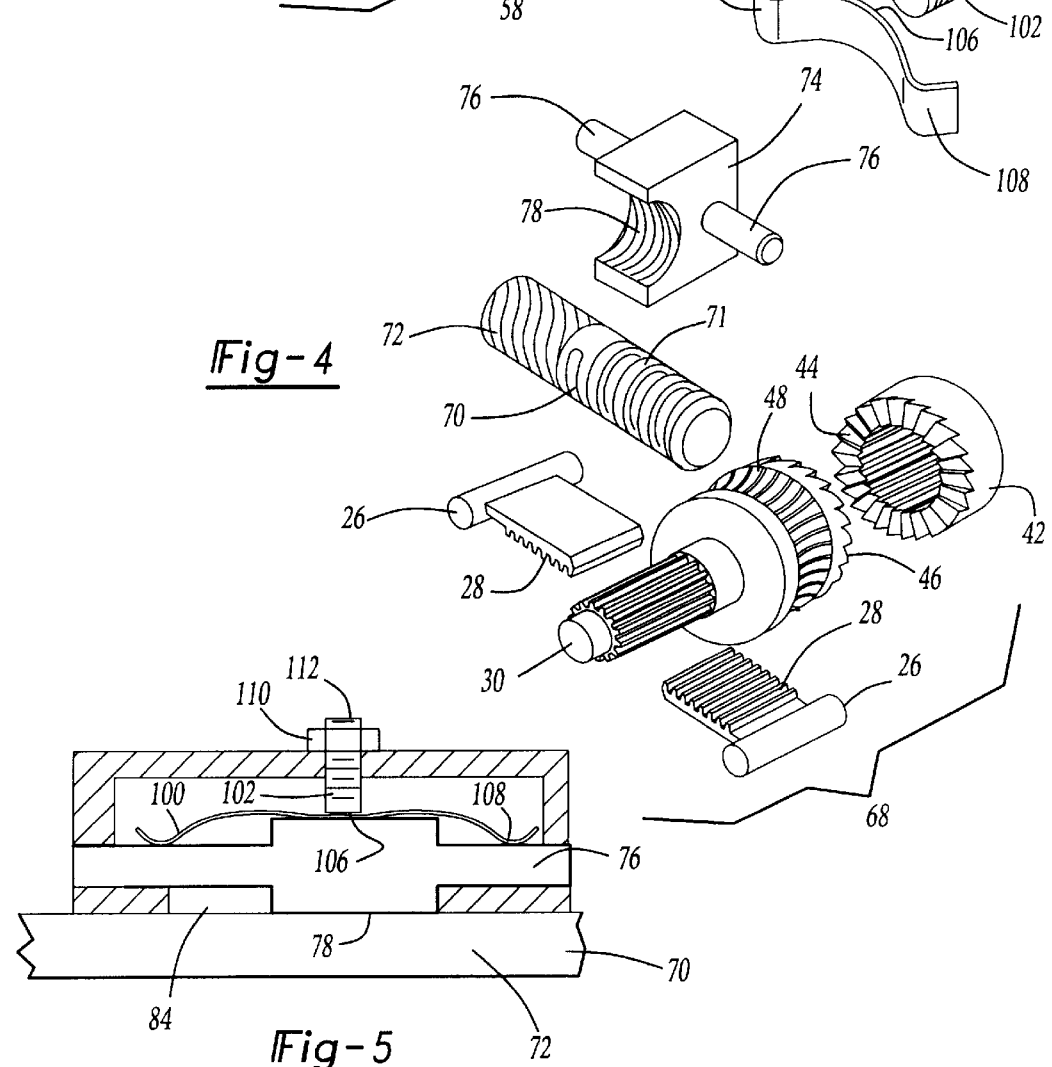
Fig-4
Fig-5

DRUM BRAKE WITH RACK AND PINION DRIVE

BACKGROUND OF THE INVENTION

This Application relates to a drum brake having a rack and pinion drive for driving the brake shoes into engagement, and further having an internal slack adjustment mechanism.

Heavy vehicles often use drum brakes for braking rotation of the vehicle wheels. In a standard drum brake, a pair of opposed shoes are pivotally driven into contact with an inner periphery of a rotating drum. A spring biases the shoes back away from the drum.

An actuator is positioned between the two shoes and is moved by an air brake actuator to drive the shoes into engagement with the drum. As an example, an s-cam is often utilized to drive shoes into engagement. The cams are driven through a mechanism that receives input from the air brake actuator, and then drives the s-cam or other actuator to move the shoes. After a period of time, friction linings on the brake shoes wear. With wear the necessary stroke of the brake to achieve the appropriate braking force increases. The air brake actuator is only capable of a particular amount of stroke, and typically a slack adjuster is positioned between the air brake actuator and the brake shoe actuator. The slack adjuster adjusts the amount of movement necessary to achieve adequate braking force by adjusting the relationship between the two actuators as wear occurs.

The known actuators have proven successful. However, it would be desirable to achieve a simpler and more accurate mechanism for driving the brake shoes and for adjusting the brake shoe actuator.

SUMMARY OF THE INVENTION

In a disclosed embodiment of this invention a rack and pinion drive is utilized to drive the brake shoes. An input drives a pinion gear, and the pinion gear engages and drives a pair of racks. The racks drive the brake shoes into engagement with a rotating brake drum.

In a preferred embodiment a slip clutch arrangement is provided between the input shaft and the pinion gear. The slip clutch arrangement allows the input shaft to drive the pinion gear when rotated to actuate the brake. On the other hand, the pinion gear must return after actuation by rotation in a reverse direction. During this reverse rotation the slip clutch allows the input gear to rotate, independently of the pinion gear to compensate for lining wear. Preferably the slip clutch includes a slip clutch member which is splined for rotation with the input shaft, but which can move axially. A spring preferably biases that slip clutch component into engagement with teeth on the pinion gear. The teeth between the pinion gear and the slip clutch component are preferably designed to achieve the above-mentioned one way of drive.

In a further feature of this invention, the pinion gear is provided with an internal adjustment mechanism that monitors the amount of stroke required to actuate the brake, and adjust the position of the rack teeth to compensate for wear. In one embodiment, the pinion gear is provided with an adjustment toothed section which is engaged by an adjustment member. The adjustment member is driven to linear travel by the worm gear toothed portion of the pinion gear as the pinion gear is rotated to actuate the brakes. A mechanism for monitoring the amount of linear movement of the adjustment member compares the amount of translation to a desired amount. If too much translation occurs, then the adjustment mechanism rotates, restricting the pinion gear return rotation, thus achieving adjustment. On the other hand, the adjustment member will return the pinion gear through the entire amount of movement if no adjustment is necessary. In one embodiment, the adjustment member has a second gear toothed portion spaced from the portion which engages the pinion gear. A motor and sensor is engaged with this second gear toothed portion. The motor and sensor monitors the amount of translation of the adjustment member, and after actuation of the brakes rotates the adjustment member, and thus the pinion gear, in a reverse direction to return the pinion gear and racks to a non-actuated position. The motor and sensor may limit the amount of return movement to an amount which is less than the actuation amount of movement, should adjustment be desirable. In one embodiment the teeth are engaged by mating spur gear-type teeth. In a second embodiment the teeth are engaged by an angled connection for driving the adjustment mechanism.

In yet another embodiment a mechanical member engages the second set of teeth, and is provided with stops to mechanically achieve the internal adjustment.

These and other features of the present invention can be best understood from the following specification and drawings, the following of which is a brief description.

BRIEF DESCRIPTION OF THE DRAWINGS

FIG. 3 is an exploded view of a second embodiment system.

FIG. 4 is an exploded view of a third embodiment system.

FIG. 5 schematically shows one feature of the FIG. 4 embodiment.

DETAILED DESCRIPTION OF THE PREFERRED EMBODIMENT

Figure 1:
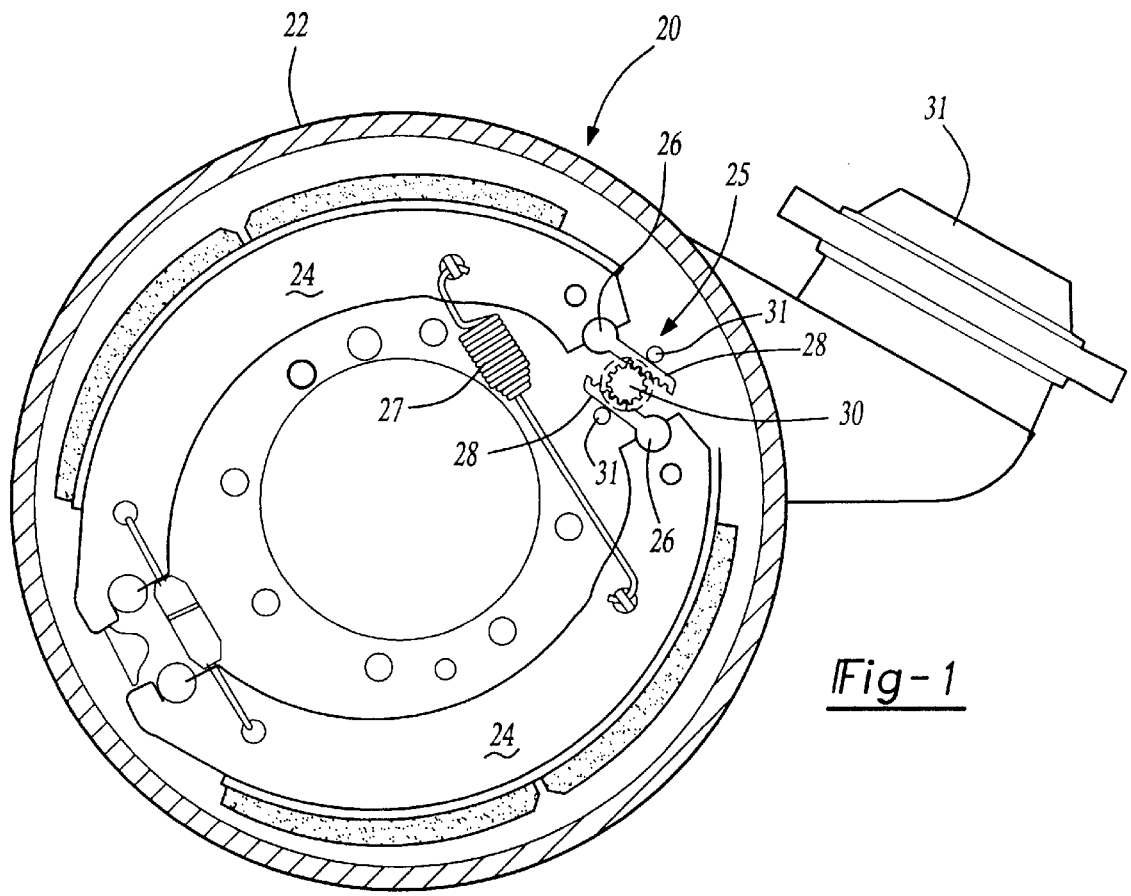
FIG. 1 is a view of a brake system incorporating the present invention.

FIG. 1 shows a brake assembly 20 incorporating a rotating drum 22 and a pair of internal brake shoes 24. As is known, an actuation mechanism drives the brake shoes into engagement with the inner periphery of the brake drum. The present invention describes an unique actuator system 25. Actuator system 25 utilizes racks 28 secured through pins 26 to the shoes 24. A pinion 30 engages the teeth on the racks 28, and the racks 28 are held in engagement with the pinion 30 by pins 31.

Upon actuation of the brake system by an operator, the pinion 30 rotates, and in turn moves the racks 28. Rack movement causes the shoes 24 to pivot into engagement with the drum 22.

Figure 2:
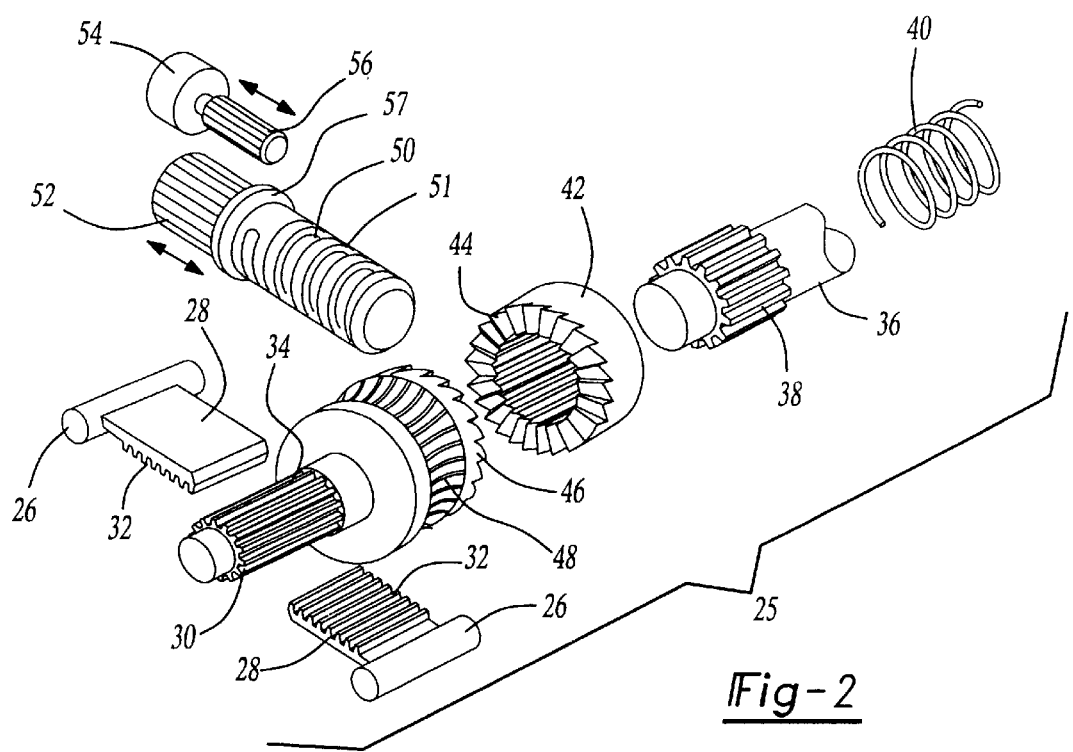
FIG. 2 is an exploded view of a first embodiment actuation system.

FIG. 2 shows a first embodiment of the actuator system 25. As shown, the input 36 includes teeth 38 and a spring 42. A slip clutch portion 42 is received on teeth 38, and is slidable along the teeth 38 but rotates with the input shaft 36. The spring 40 biases the slip clutch portion 42 and its teeth 44 into engagement with teeth 46 on the pinion gear 30. The teeth 44 and 46 are shown somewhat schematically, but are designed such that rotation is only transmitted between portion 42 and pinion 30 in one direction. Now, when the shaft 36 is driven to actuate the brakes, the slip clutch portion 42 and teeth 44 do drive teeth 46 and pinion 30. However, as will be explained below, after actuation the pinion 30 must be returned to a non-actuated position. This requires pinion 30 to rotate in an opposed direction to that which is utilized for actuation. During this opposed rotation, the teeth 44 and 46 slip relative to each other, and the input shaft 36 does not experience the same reverse rotation. Essentially, the teeth 44 and 46 are designed such that upon rotation in this opposed direction the slip clutch component 42 slides along teeth 38 against the force of spring 40, and the pinion gear 30 can thus rotate in the opposed direction. The design of appropriate teeth 44 and 46 is well within the skill of a worker in this art.

An internal adjustment mechanism is also provided on the pinion gear 30. In particular, adjustment worm gear teeth 48 are formed on the pinion gear intermediate teeth 46 and 30. An adjustment mechanism 50 provided with a worm gear thread 51 engages worm gearing 48. A set of drive teeth 52 is also formed on the adjustment member 50. A motor 54 drives a toothed member 56 which is engaged with the teeth 52. Upon actuation by the input shaft 36, the worm gear teeth 48 rotate. That rotation is transmitted to the worm gear teeth 51, and hence to the gear teeth 52. The gear teeth 52 are engaged with the gear teeth 56 and thus the gear teeth 52 slide linearly with teeth 56. Ring 57 ensures the two slide together. Motor 54 includes a linear displacement sensor which monitors the amount of translation of gear teeth 56. After actuation the motor 54 drives the gear teeth 56 in the opposed direction, when adjustment is required. This rotates teeth 52, and thread 51 in the opposed direction. In turn, the gear teeth 48 rotate in the opposed direction and the pinion gear 30 thus rotates in the opposed direction to return the rack 28 to the non-actuated positions. As mentioned above, during this reverse rotation the slip clutch portion 42 moves out of engagement to allow this reverse rotation. The motor 54 monitors the amount of movement of the pinion during actuation. If the amount of movement indicates that adjustment is necessary, then the return of the pinion is limited to a new adjusted position. Thus, if during actuation the gear teeth 52 and 56 translate 1 inch and only 0.5 inch is desirable, it may be that upon return, the gear teeth 56 is rotated back enough to restrict linear displacement to 0.5 inches. This would create a new non-actuated adjusted position wherein the racks 28 are in a position which is closer to the engaged position.

FIG. 3 shows another embodiment wherein the adjustment member 60 is provided with the thread 61 and gear teeth 62. Gear teeth 62 are engaged by an angled engagement member 64 driven by a member 66. The general operation of this embodiment is identical to that discussed above.

FIG. 4 shows another embodiment 68, where the adjustment member 70 is provided with a thread 71 engaging the threads 48. A second thread portion 72 is selectively engaged by a block 74. Block 74 has pins 76 to prevent rotation of block 74 and gear teeth 78 which selectively engage gear teeth 72, which is held in place by a spring 100 that is put in compression by adjuster 102. Adjuster 102 applies force to the central portion 106 of spring 100. Ends 108 of the spring contact pins 76. The locknut 110 is received in threads 112 of the adjuster 102 to allow tension adjustment of the spring 100. Now, upon rotation of the teeth 48, the adjustment member 70 moves linearly. During this rotation, the block 74 moves to the left as shown in FIG. 5, since it is constrained against rotation. As can be appreciated from FIG. 5, the block 74 is movable between two ends 80 and 82, and across a space 84. After a period of movement the block 74 hits stop 82. No further movement of the block 74 is possible. At that point, the adjustment mechanism 70 will begin to move axially relative to the block 74 and skips a tooth relative to block 74, which is spring loaded to hold pressure against adjustment member 70. As can be appreciated, when the end is reached, the block 104 is able to overcome the force of the spring 100 and moved away from adjustment member 70 allowing the tooth to be skipped. After actuation, the block 74 will now be at a new location on the adjustment member 70. This new location will thus rotate the adjustment mechanism 70 during return and would create a new non-actuated adjusted position wherein the racks 28 are in a position which is closer to the engaged position.

Although preferred embodiments of this invention have been disclosed, a worker of ordinary skill in the art would recognize that certain modifications come within the scope of this invention. For that reason the following claims should be studied to determine the true scope and content of this invention.

What is claimed is:

1. A drum brake assembly comprising:

a rotating drum having an inner peripheral surface;

a pair of brake shoes selectively engageable with said inner peripheral surface of said drum;

an actuation mechanism for moving said brake shoes selectively into engagement with said inner peripheral surface of said brake drum, said actuation mechanism including an input shaft driving a pinion gear, and a pair of rack members driven by said pinion gear, said rack members each associated with one of said brake shoes such that upon rotation of said pinion gear said rack members move said brake shoes into engagement with said drum in a peripheral surface; and an input shaft for said brake assembly slideably receiving a slip clutch member, said slip clutch member transmitting rotation from said input shaft to said pinion gear when said input shaft is rotated in a first direction but said slip clutch allowing said pinion gear and said shaft to rotate relative to each other if said pinion gear is rotated in a direction opposed to said first direction.

2. A brake assembly as recited in claim 1, wherein pins hold said rack members in engagement with said pinion member.

3. A brake assembly as recited in claim 1, wherein said slip clutch portion includes a plurality of teeth engaged with teeth on said pinion to provide said slip clutch feature.

4. A drum brake assembly comprising:

a rotating drum having an inner peripheral surface;

a pair of brake shoes selectively engageable with said inner peripheral surface of said drum;

an actuation mechanism for moving said brake shoes selectively into engagement with said inner peripheral surface of said brake drum, said actuation mechanism including an input shaft driving a pinion gear, and a pair of rack members driven by said pinion gear, said rack members each associated with one of said brake shoes such that upon rotation of said pinion gear said rack members move said brake shoes into engagement with said drum in a peripheral surface, and, wherein a plurality of adjustment teeth are also formed on said pinion gear, and an adjustment member is driven by said adjustment teeth during rotation of said pinion gear to move said brake shoes into engagement, said adjustment member being driven to return said actuation mechanism after braking, and said adjustment member limiting the amount of return movement when adjustment is desirable.

5. A brake assembly as recited in claim 4, wherein said adjustment member includes a monitoring member which monitors the amount of translation of said adjustment member and drives said adjustment member to return said pinion gear to a non-actuated position after the braking cycle is over.

6. A brake assembly as recited in claim 5, wherein said adjustment mechanism includes a motor driving a gear toothed member engaging gear teeth on said adjustment mechanism.

7. A brake assembly as recited in claim 6, wherein said gear toothed member includes a pair of gears having gear teeth centered on parallel axes.

8. A brake assembly as recited in claim 6, wherein said adjustment mechanism includes a motor having a gear toothed member rotating on an axis generally perpendicular to an axis of said adjustment member.

9. A brake assembly as recited in claim 4, wherein said adjustment member includes a block which is constrained against rotation, but which is moveable axially relative to said adjustment member, said block being received within a housing such that it is prevented from movement beyond two axial ends of said housing and said block hitting said axial ends of said housing to stop further movement of said block, and cause a limitation in the return movement of said pinion gear to provide adjustment.

10. A brake assembly as recited in claim 9, wherein a spring holds said block against said adjustment member, said spring allowing said block to move away from said adjustment member to allow adjustment.

11. drum brake assembly comprising:

a rotating drum having an inner peripheral surface;

a pair of brake shoes selectively engageable with said inner peripheral surface of said drum; and an actuation mechanism for moving said brake shoes selectively into engagement with said inner peripheral surface of said brake drum, said actuation mechanism including an input shaft driving a pinion gear, and a pair of rack members driven by said pinion gear, said rack members each associated with one of said brake shoes such that upon rotation of said pinion gear said rack members move said brake shoes into engagement with said drum in a peripheral surface; and said actuation mechanism including a member which turns to drive said brake shoes into engagement, said actuation mechanism having an adjustment member engaged with said actuation mechanism such that rotation of said actuation mechanism rotates said adjustment member, said adjustment member being driven to return said actuation mechanism after braking, and said adjustment member limiting the amount of return movement of said actuation member if adjustment is desirable.

12. A brake assembly as recited in claim 11, wherein a plurality of adjustment teeth are formed on said actuation mechanism and said adjustment member is driven by said adjustment teeth during rotation of said actuation mechanism to move said brake shoes into engagement.

13. A brake assembly as recited in claim 12, wherein said adjustment member includes a monitoring member which monitors the amount of rotation of said adjustment member and drives said adjustment member to return said pinion gear to a non-actuated position after the braking cycle is over.

14. A brake assembly as recited in claim 13, wherein said adjustment mechanism includes a motor driving a gear toothed member engaging gear teeth on said adjustment mechanism.

15. A brake assembly as recited in claim 14, wherein said gear toothed member includes a pair of gears having gear teeth centered on parallel axes.

16. A brake assembly as recited in claim 14, wherein said adjustment mechanism includes a motor having a gear toothed member rotating on an axis generally perpendicular to an axis of said adjustment member.

17. A brake assembly as recited in claim 12, wherein said adjustment member includes a block which is constrained against rotation, but which is moveable axially relative to said adjustment member, said block being received within a housing such that it is prevented from movement beyond two axial ends, and said block hitting said axial ends to stop further movement of said block, and cause a limitation in the return movement of said pinion gear to provide adjustment.

* * * * *